United States Patent
Fu

(10) Patent No.: US 10,754,544 B2
(45) Date of Patent: Aug. 25, 2020

(54) METHOD, DEVICE AND SYSTEM FOR MANIPULATING PRESENTATION CONTENT OF SCREEN TRANSMISSION

(71) Applicant: GUANGZHOU SHIRUI ELECTRONICS CO. LTD., Guangzhou (CN)

(72) Inventor: Yulin Fu, Guangzhou (CN)

(73) Assignee: GUANGZHOU SHIRUI ELECTRONICS CO. LTD., Guangzhou (CN)

( * ) Notice: Subject to any disclaimer, the term of this patent is extended or adjusted under 35 U.S.C. 154(b) by 0 days.

(21) Appl. No.: 16/093,981

(22) PCT Filed: Dec. 29, 2016

(86) PCT No.: PCT/CN2016/113196
§ 371 (c)(1),
(2) Date: Oct. 16, 2018

(87) PCT Pub. No.: WO2017/185797
PCT Pub. Date: Nov. 2, 2017

(65) Prior Publication Data
US 2019/0129613 A1    May 2, 2019

(30) Foreign Application Priority Data

Apr. 25, 2016 (CN) .......................... 2016 1 0269812

(51) Int. Cl.
*G06F 3/0488* (2013.01)
*G06F 3/14* (2006.01)
(Continued)

(52) U.S. Cl.
CPC ........ *G06F 3/04886* (2013.01); *G06F 3/0481* (2013.01); *G06F 3/0488* (2013.01);
(Continued)

(58) Field of Classification Search
CPC .............. G06F 3/04886; G06F 3/0481; G06F 3/04845; G06F 3/0488; G06F 3/04883; G06F 3/14; G06F 9/44; G06F 2203/0383
See application file for complete search history.

(56) References Cited

U.S. PATENT DOCUMENTS

2012/0192093 A1\* 7/2012 Migos ................. G06F 3/04883
715/773
2015/0109225 A1    4/2015 Hu

FOREIGN PATENT DOCUMENTS

| CN | 102141882 A | 8/2011 |
|----|-------------|--------|
| CN | 102802068 A | 11/2012 |

(Continued)

OTHER PUBLICATIONS

First Office Action for Chinese Appl. No. 201610269812.5, Applicant Guangzhou Shirui Electrical Technology Co., Ltd., dated Apr. 28, 2018, 13 pages.

(Continued)

*Primary Examiner* — Peter D McLoone
(74) *Attorney, Agent, or Firm* — Zhong Law, LLC

(57) ABSTRACT

Provided are a method, a device and a system for manipulating presentation content of screen transmission. The method includes: receiving play start information for presentation content at a screen transmission source end transmitted by a corresponding screen transmission hardware, and starting a preset play manipulation mode at a screen transmission presentation end (S11); detecting a preset touch operation signal in the play manipulation mode, and obtaining a preset play control instruction corresponding to the touch operation signal (S12); and controlling, according to the play control instruction, the presentation content at the screen transmission presentation end to enter a correspond- (Continued)

ing play state (S13). Based on this, it is possible to implement manipulation of the presentation content on a large touch screen, facilitate users' operations, and advantageously improve the user experience.

16 Claims, 4 Drawing Sheets

(51) Int. Cl.
  *G06F 9/44* (2018.01)
  *G06F 3/0481* (2013.01)
  *G06F 3/0484* (2013.01)

(52) U.S. Cl.
  CPC ...... *G06F 3/04845* (2013.01); *G06F 3/04883* (2013.01); *G06F 3/14* (2013.01); *G06F 9/44* (2013.01); *G06F 2203/0383* (2013.01)

(56) References Cited

FOREIGN PATENT DOCUMENTS

| | | |
|---|---|---|
| CN | 202758595 U | 2/2013 |
| CN | 203164829 U | 8/2013 |
| CN | 104301012 A | 1/2015 |
| CN | 204217085 U | 3/2015 |
| CN | 105045548 A | 11/2015 |
| CN | 105138262 A | 12/2015 |
| CN | 105677135 A | 6/2016 |
| CN | 105955685 A | 9/2016 |
| JP | 2008108184 A | 5/2008 |
| WO | 2013008330 A1 | 1/2013 |

OTHER PUBLICATIONS

European Application No. 16900301.9, Extended European Search Report dated Apr. 5, 2019, 13 pages.
International Search Report and Written Opinion dated Mar. 28, 2017 received in PCT/CN2016/113196, pp. 11.

\* cited by examiner

METHOD, DEVICE AND SYSTEM FOR MANIPULATING PRESENTATION CONTENT OF SCREEN TRANSMISSION

CROSS-REFERENCE TO RELATED APPLICATIONS

This application claims priority to International Patent Application No. PCT/CN2016/113196 filed Dec. 29, 2016, which claims priority to Chinese application No. CN 201610269812.5, filed Apr. 25, 2016, the contents of which are hereby incorporated by reference as though fully set forth herein.

TECHNICAL FIELD

The present invention relates to screen transmission technologies and, in particular, to a method, a device and a system for manipulating presentation content of screen transmission.

BACKGROUND

Screen transmission refers to displaying presentation content displayed on one device screen (a screen transmission source end) onto another device screen (a screen transmission presentation end), such as displaying a picture, a PowerPoint (PPT) or other document content displayed on a computer onto a conference screen, or displaying content displayed on a mobile phone onto a TV screen. The screen transmission mode includes wired screen transmission and wireless screen transmission, where the wireless screen transmission refers to a wireless transmission of presentation content displayed on one device display screen onto another device screen.

In a traditional implementation of screen transmission, when using a projection or HDMI/VGA cable to project a screen of the computer, the mobile phone or the like onto a large display screen for PPT presentation, the user cannot directly control play operations such as flipping over and exit of the PPT on the large display screen, but to remotely control the computer to play the operations by means of a remote pointer or specifically assign a person to play the corresponding operations at the computer end, which is inconvenient for the user to perform operations for presentation content at the large display screen end.

SUMMARY

Based on this, embodiments of the present invention provide a method, a device and a system for manipulating presentation content of screen transmission, which can implement manipulation of the presentation content on a large touch screen, facilitate users' operations, and advantageously improve the user experience.

In one aspect, the embodiments of the present invention provide a method for manipulating presentation content of screen transmission, including:

responsive to receiving play start information for presentation content at a screen transmission source end transmitted by a corresponding screen transmission hardware, starting a preset play manipulation mode at a screen transmission presentation end;

responsive to detecting a preset touch operation signal in the play manipulation mode, obtaining a preset play control instruction corresponding to the touch operation signal; and controlling, according to the play control instruction, the presentation content at the screen transmission presentation end to enter a corresponding play state.

In another aspect, the embodiments of the present invention provide a method for manipulating screen transmission presentation content, including:

monitoring a play start event for presentation content at a screen transmission source end, and transmitting play start information to a corresponding screen transmission presentation end via a preset screen transmission hardware;

receiving the play start information transmitted by the screen transmission hardware, and starting a preset play manipulation mode at the screen transmission presentation end;

detecting, in the play manipulation mode, a preset touch operation signal at the screen transmission presentation end;

obtaining a preset play control instruction corresponding to the touch operation signal, and controlling, according to the play control instruction, the presentation content at the screen transmission presentation end to enter a corresponding play state.

In another aspect, the embodiments of the present invention provide a device for manipulating screen transmission presentation content, including:

a manipulation mode start module to receive play start information for presentation content at a screen transmission source end transmitted by a corresponding screen transmission hardware, and start a preset play manipulation mode at a screen transmission presentation end;

a touch detection module to detect a preset touch operation signal in the play manipulation mode, and obtain a preset play control instruction corresponding to the touch operation signal; and a play control module to control, according to the play control instruction, the presentation content at the screen transmission presentation end to enter a corresponding play state.

In another aspect, the embodiments of the present invention provide a system for manipulating presentation content of screen transmission, including a screen transmission source end, a screen transmission presentation end coupled to the screen transmission source end via a screen transmission hardware, where the screen transmission source end includes: a message initiation module to monitor a play start event for presentation content at the screen transmission source end, and transmit play start information to the corresponding screen transmission presentation end via a preset screen transmission hardware;

where the screen transmission presentation end includes:

a manipulation mode start module to receive the play start information for the presentation content at the screen transmission source end transmitted by the screen transmission hardware, and start a preset play manipulation mode;

a touch detection module to detect a preset touch operation signal in the play manipulation mode, and obtain a preset play control instruction corresponding to the touch operation signal; and a play control module to control, according to the play control instruction, the presentation content at the screen transmission presentation end to enter a corresponding play state.

The above technical solutions are implemented by receiving play start information for presentation content at a screen transmission source end transmitted by a corresponding screen transmission hardware, and starting a preset play manipulation mode at a screen transmission presentation end; detecting a preset touch operation signal in the play manipulation mode, and obtaining a preset play control instruction corresponding to the touch operation signal; and controlling, according to the play control instruction, the presentation content at the screen transmission presentation end to enter a corresponding play state. The solutions according to the embodiments of the present invention described above can implement manipulation of the presentation content at the presentation end, facilitate users' operations and advantageously improve the user experience.

BRIEF DESCRIPTION OF DRAWING(S)

DESCRIPTION OF EMBODIMENTS

The embodiment of the present invention will be further described in detail below with reference to the accompanying drawings and embodiments. It should be understood that the specific embodiments described herein are merely illustrative of the present invention but not intended to limit the present invention.

Figure 1:
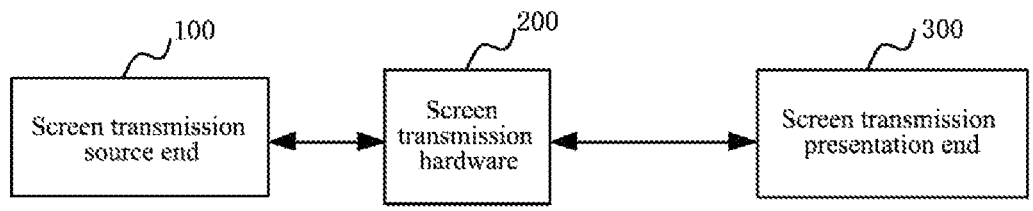
FIG. 1 is a schematic diagram of a working environment according to an embodiment of the present invention.

FIG. 1 illustrates a schematic diagram of a working environment according to an embodiment of the present invention, including: a screen transmission source end 100 capable of playing a multimedia file such as a PPT file. Using a PC as an example, the screen transmission source end 100 may be connected to a screen transmission hardware 200 using a USB port; the screen transmission hardware 200 is wirelessly connected to a screen transmission presentation end 300; the screen transmission presentation end 300 can be a terminal including a touch display screen, such as a large touch screen of a conference machine, or the like. Moreover, the screen transmission source end 100 may display its presentation content on the screen transmission presentation end 300 by way of screen transmission via the screen transmission hardware 200 for demonstration.

Preferably, the screen transmission hardware 200 may be a wireless screen transmission hardware, which is provided with a corresponding wireless connection module and can be wirelessly coupled to the screen transmission presentation end 300 via a wireless network. A wireless screen transmission software is running in a system at the screen transmission source end 100, the wireless screen transmission receiving software is running in a system at the screen transmission presentation end 300, and the screen transmission source end 100 may display its presentation content to a display screen at the screen transmission presentation end 300 by way of wireless screen transmission via the screen transmission hardware 200.

In conjunction with the schematic diagram as shown in FIG. 1, the following describes various embodiments of a method, a device, and a system for manipulating screen transmission presentation content.

Figure 2:
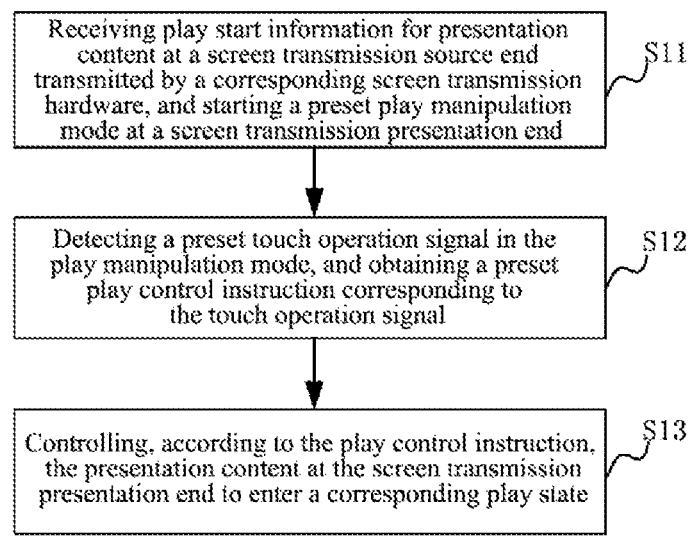
FIG. 2 is a schematic flowchart of a method for manipulating presentation content of screen transmission according to an embodiment.

FIG. 2 is a schematic flowchart of a method for manipulating screen transmission presentation content according to an embodiment; in this embodiment, as an example, the method is applied to the screen transmission presentation end 300.

As shown in FIG. 2, the method for manipulating the screen transmission presentation content in this embodiment includes the following steps:

S11, receiving play start information for presentation content at a screen transmission source end transmitted by a corresponding screen transmission hardware, and starting a preset play manipulation mode at a screen transmission presentation end.

In this embodiment, as shown in FIG. 1, the screen transmission source end may be connected to the screen transmission hardware using a USB port, and using the screen transmission hardware by way of wireless screen transmission, display the presentation content to the screen transmission presentation end for demonstration. The screen transmission presentation end can only synchronously present, in a default state (default mode), the content displayed at the screen transmission source end. The user cannot directly perform, at the screen transmission presentation end, play control such as page flipping and annotation for the presentation content.

Specifically, when the screen transmission source end starts to play the presentation content, a play start message may be transmitted to the screen transmission hardware through a USB port; further, the screen transmission hardware may transmit play start information for the presentation content at the screen transmission source end to the screen transmission presentation end via a wireless network such as Bluetooth or WIFI; the screen transmission presentation end may monitor the information transmitted by the screen transmission hardware via a wireless screen transmission receiving software that is running, if the play start information is received, a preset play manipulation mode is started. After the screen transmission presentation end enters the play manipulation mode from the default mode, the user may directly perform play control such as page flipping, exit, or annotation for the presentation content via the screen transmission presentation end.

S12, detecting a preset touch operation signal in the play manipulation mode, and obtaining a preset play control instruction corresponding to the touch operation signal;

As a preferred embodiment, after a preset play manipulation mode is started at the screen transmission presentation end, a preset play toolbar will be displayed on the presentation content, where the play toolbar includes a plurality of touch control buttons. Moreover, the play toolbar is displayed always on top, and is not affected by the play state of the presentation content. For example, if the presentation content is a PPT, the play toolbar may include a PageUp button, a PageDown button, a presentation exit button, an annotation button, an annotation close button, etc. A corresponding play control instruction may be obtained by detecting a touch signal corresponding to each touch control button in the play toolbar. Correspondingly, the method for manipulating presentation content of the screen transmission according to this embodiment may further include steps of: establishing an association between the touch signal of each touch control button in the play toolbar and the corresponding play control instruction, and storing the association.

When the user clicks on a touch control button in the play toolbar, the screen transmission presentation end detects the touch signal, and a corresponding play control instruction may be obtained by querying the association.

Preferably, the play toolbar is displayed on the left or right side of the touch screen at the screen transmission presentation end, which is convenient for the user to operate, and meanwhile the interference with the presentation content is reduced.

As another preferred embodiment, the play manipulation mode is started at the screen transmission presentation end, a transparent view layer for receiving a touch signal may be generated on the presentation content at the screen transmission presentation end; a preset touch operation signal is detected via the transparent view layer. Moreover, the transparent view layer is displayed always on a top overlay layer, and is not affected by the play state of the presentation content. Further, a preset play control instruction corresponding to the touch operation signal may be obtained. Correspondingly, the method for manipulating the screen transmission presentation content further includes steps of: storing several touch operation signals (such as a touch signal that is left-right slidable or a touch signal that is up-down slidable), establishing an association between each touch operation signal and a corresponding play control instruction, and storing the association. For example, if the presentation content is a PPT, a corresponding relationship between a touch signal sliding from left to right and a PageDown instruction may be established, a corresponding relationship between a touch signal sliding from right to left and a PageUp instruction may be established, a corresponding relationship between a touch signal sliding from up to down and a PageDown instruction may be established, or a corresponding relationship between a touch signal sliding from down to up and a PageUp instruction may be established. According to practical operating habits, an association between a further touch operation signal and a page flipping instruction may also be established. The user performs a corresponding touch operation on the display screen at the screen transmission presentation end, the screen transmission presentation end detects the touch operation signal, and a corresponding play control instruction may be obtained by querying the association. This approach is more convenient for the user to operate.

Preferably, the transparent view layer is a full-screen transparent view layer, that is, the same as the touch screen at the screen transmission presentation end in terms of size, which is further convenient for the user to operate.

It can be understood that the foregoing two embodiments may be combined, that is, a transparent view layer for receiving a touch signal is generated on the presentation content at the screen transmission presentation end, meanwhile the play toolbar is also displayed, and the play toolbar is displayed on the transparent view layer. The user can control the play state of the presentation content at the screen transmission presentation end by both a click on the touch control button in the play toolbar and a sliding operation.

S13, controlling, according to the play control instruction, the presentation content at the screen transmission presentation end to enter a corresponding play state.

In this embodiment, the presentation content may include a multimedia file such as a PPT (PowerPoint) file, a picture, and a Word document. The play control instruction includes a page flipping instruction, a presentation exit instruction, or an annotation instruction. Correspondingly, if the instruction obtained in step S12 is the page flipping instruction, then the presentation content at the screen transmission presentation end is controlled to flip over (PageUp or PageDown); if the instruction obtained in step S12 is the presentation exit instruction, then the screen transmission presentation end is controlled to exit a presentation of the presentation content; if the instruction obtained in step S12 is the annotation instruction, then the screen transmission presentation end may be controlled to switch to a preset annotation mode. Touch operation information for the presentation content at the screen transmission presentation end may be detected in the annotation mode, and corresponding annotation information is generated according to the touch operation information.

Further, in the annotation mode, according to the touch operation information from the user on the screen transmission presentation end, the annotation information that has been generated may be performed with operations such as erasing, modification, etc.

As a preferred embodiment, if the instruction obtained in step S12 is the page flipping instruction, the method for manipulating presentation content of the screen transmission may further include steps of: transmitting, via the screen transmission hardware, flipping event information at the screen transmission presentation end to the screen transmission source end, so that the screen transmission source end controls its presentation content for a corresponding flipping over after receiving the flipping event information, thereby realizing the effect of controlling the play state of the presentation content from the presentation end.

It can be understood that, according to a practical situation, the presentation event exit information or the annotation event information at the screen transmission presentation end can also be transmitted to the screen transmission source end via the screen transmission hardware, hence, the screen transmission source end's control for the presentation content is consistent with the screen transmission presentation end's control for the presentation content.

As a preferred embodiment, after the play manipulation mode is started at screen transmission presentation end, if play end information for the presentation content at the screen transmission source end transmitted by the screen transmission hardware is received, then the screen transmission presentation end is controlled to exit the play manipulation mode. That is, the play toolbar is closed, the transparent view layer is removed, and the screen transmission presentation end is switched to the default mode.

Figure 3:
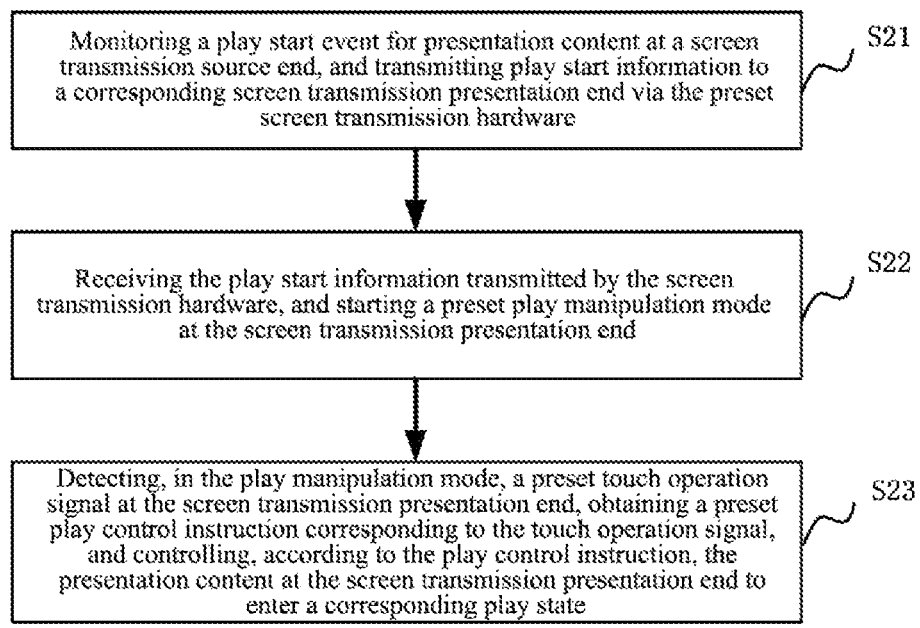
FIG. 3 is a schematic flowchart of a method for manipulating presentation content of screen transmission according to another embodiment.

FIG. 3 is a schematic flowchart of a method for manipulating presentation content of screen transmission according to another embodiment; in this embodiment, descriptions are made to an interaction process between the screen transmission source end and the screen transmission presentation end.

As shown in FIG. 3, the method for manipulating presentation content of the screen transmission in this embodiment includes the following steps:

S21, monitoring a play start event for presentation content at a screen transmission source end, and transmitting play start information to a corresponding screen transmission presentation end via the preset screen transmission hardware;

S22, the screen transmission presentation end receives the play start information transmitted by the screen transmission hardware, and starts a preset play manipulation mode at the screen transmission presentation end; and S23, the screen transmission presentation end detects a preset touch operation signal in the play manipulation mode, and obtains a preset play control instruction corresponding to the touch operation signal, and controls, according to the play control instruction, the presentation content at the screen transmission presentation end to enter a corresponding play state.

As a preferred embodiment, the method for manipulating the screen transmission presentation content according to this embodiment further includes steps of:

monitoring a play end event for the presentation content at the screen transmission source end, and transmitting play end information to the screen transmission presentation end via the screen transmission hardware; the screen transmission presentation end receives the play end information, and controls the screen transmission presentation end to exit the play manipulation mode.

As a preferred embodiment, the screen transmission source end may monitor a play start event or a play end event for the presentation content at the screen transmission source end by calling a corresponding COM component, or by monitoring a change in a state of a display window.

Figure 4:
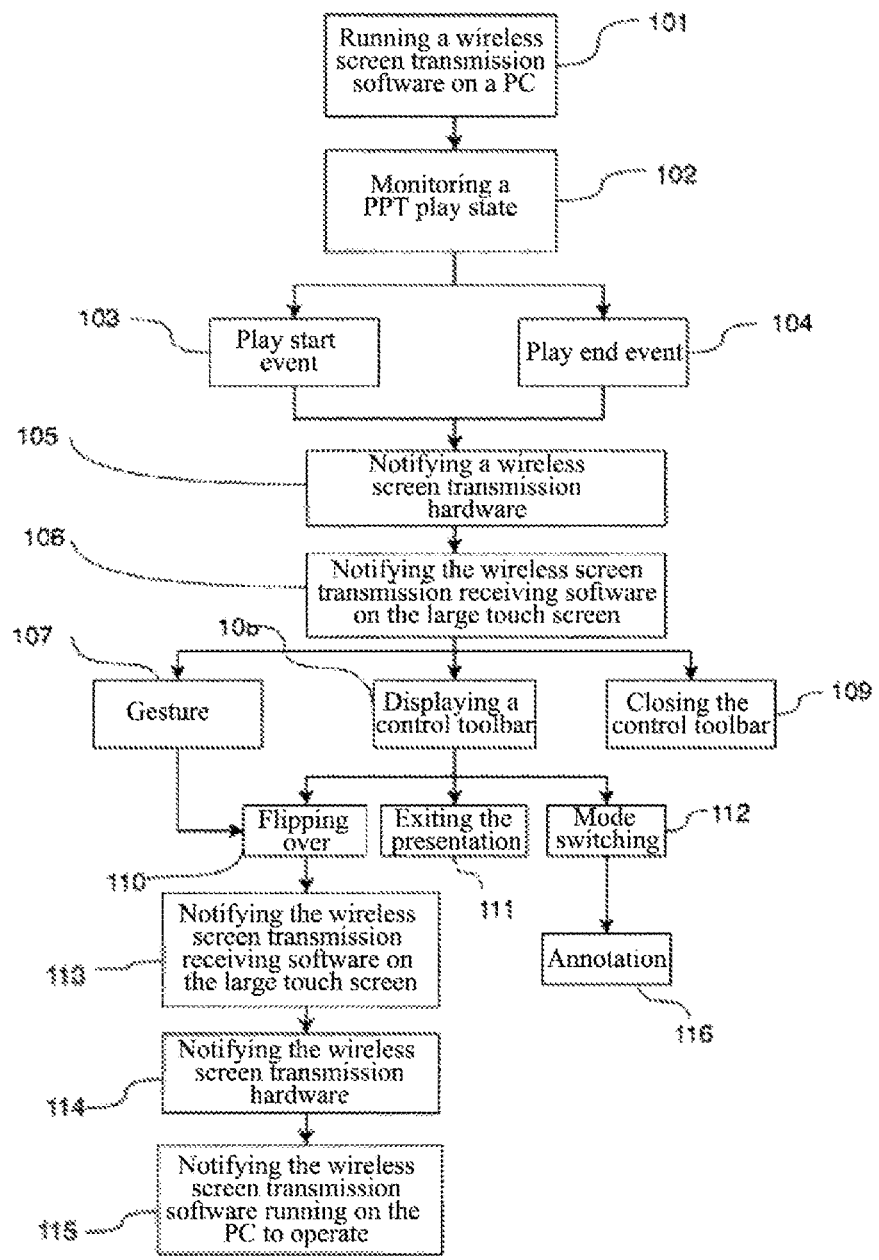
FIG. 4 is a schematic flowchart of a specific application of a method for manipulating presentation content of screen transmission according to another embodiment.

The method for manipulating presentation content of the screen transmission according to another embodiment will be described below with reference to a specific application. The screen transmission source end can be a personal computer (PC), the screen transmission presentation end can be a large touch screen, the screen transmission hardware can be a wireless screen transmission hardware, and the presentation content is a PPT file. As shown in FIG. 4, the method for manipulating the screen transmission presentation content includes the following steps:

Step 101: opening a PPT at a PC end, running a wireless screen transmission software, and entering a wireless screen transmission state.

Step 102: monitoring a PPT play state at the PC side.

The PPT play state may be detected by calling a corresponding COM component or by monitoring a change in a state of a display window;

Step 103: the wireless screen transmission software at the PC side detects PPT play start information, and proceed to Step 105.

Step 104: the wireless screen transmission software at the PC side detects PPT play end information, and proceed to Step 105.

Step 105: the PC notifies wireless screen transmission hardware.

The wireless screen transmission software at the PC side may notify the wireless screen transmission hardware of a corresponding play state message using USB communications.

Step 106: the wireless screen transmission hardware is connected to a wireless hotspot transmitted by the large touch screen; communications are made via the wireless hotspot; the corresponding play state message is notified to the wireless screen transmission receiving software at the large touch screen; if it is the PPT play start information, proceed to Step 107 and Step 108; if it is the PPT play end information, proceed to Step 109.

Step 107: detecting a touch gesture at a large touch screen end.

When the wireless screen transmission receiving software at the large touch screen receives the PPT play start information at the PC end, generating, on top overlay layer of the display window of the large touch screen, a full-screen transparent view layer for receiving the touch information, and identifying the touch gesture of a sliding operation from left to right as a page flipping instruction; proceed to Step 110.

Step 108: displaying a control toolbar.

When the wireless screen transmission receiving software at the large touch screen receives PPT play start information at the PC side, displaying a PPT play control toolbar on top of the display window at the large touch screen, receiving touch operation information via a touch control button in the toolbar, and obtaining a corresponding control instruction. Proceed to a corresponding step (Step 110, Step 111 or Step 112) according to control instructions corresponding to different touch control buttons.

Step 109: exiting the play manipulation mode.

When the wireless screen transmission receiving software at the large touch screen receives the PPT play end information at the PC side, controlling the screen transmission presentation end to exit the play manipulation mode, closing the PPT toolbar and removing the full-screen transparent view layer.

Step 110: page flipping.

if the user clicks the PageUp/PageDown arrow button in the toolbar, or swipes left/right on the large touch screen, the large touch screen may be triggered to perform a corresponding page flipping for a currently presented PPT.

Step 111: exiting the presentation.

If the user clicks the presentation exit button in the PPT toolbar, the large touch screen may be triggered to execute an instruction to end the presentation of the PPT.

Step 112: switching to an annotation mode;

If the user clicks the annotation button in the PPT toolbar, or other preset touch events associated with an annotation instruction (for example, long press the touch screen), the presentation end may be triggered to enter the annotation mode, proceed to Step 116.

In addition, in the annotation mode, if a touch event of clicking the annotation close button in the PPT toolbar is detected, the large touch screen is triggered to exit from the annotation mode and return to the play manipulation mode.

Step 113: the wireless screen transmission receiving software detects the PPT play operation event information at the large touch screen end;

The page flipping event information of the PTT or the presentation exit of the PPT at the large touch screen side will be broadcasted to the wireless screen transmission receiving software on the large touch screen.

Step 114: notifying the wireless screen transmission hardware via the wireless screen transmission receiving software;

The wireless screen transmission receiving software on the large touch screen performs communications via the wireless hotspot, and the wireless screen transmission hardware is notified of a PPT flipping event or a PPT presentation exit message.

Step 115: the wireless screen transmission hardware notifies the wireless screen transmission software running at the PC side.

The wireless screen transmission hardware notifies the PPT flipping event or the PPT presentation exit message to the wireless screen transmission software running on the PC by way of USB communications, after receiving the message, the wireless screen transmission software controls the PC to perform an operation corresponding to the flipping over of the PPT page or the exit of the PPT presentation.

Step 116: generating an annotation.

After entry of the annotation mode, the user can write or mark on the large touch screen, and corresponding annotation information is generated according to the detected touch information. Further, the eraser tool in the PPT toolbar may be selected to erase the generated annotation information via a touch gesture.

Through the above-described method for manipulating the screen transmission presentation content, the effect of directly controlling, at the presentation end, the PPT play is achieved, and an auxiliary function of quick annotation is provided, which is more convenient for the user to present the PPT.

It can be understood that, the foregoing embodiments are described by taking the wireless screen transmission mode as an example, and descriptions are made to the method for manipulating presentation content of the screen transmission described above. Based on similar principles, the method for manipulating the screen transmission presentation content described above can also be applied to a wired screen transmission scenario.

It should be noted that, for the sake of brevity, the foregoing method embodiments are all described as a series of action combinations, but those skilled in the art should understand that the present invention is not limited by the described action sequence. According to the present invention, certain steps can be used in other sequences or at the same time.

Based on the same idea as that of the method for manipulating presentation content of the screen transmission in the above embodiments, the present invention also provides a device for manipulating presentation content of screen transmission which can be used to perform the method for manipulating the presentation content of screen transmission described above. For the convenience of description, in the structural schematic diagram of the embodiment device for manipulating the presentation content of screen transmission, only parts related to the embodiments of the present invention are shown. Those skilled in the art can understand that the illustrated structure does not limit the device, and may include more or less components than those illustrated, or some components may be combined, or different parts may be arranged.

Figure 5:
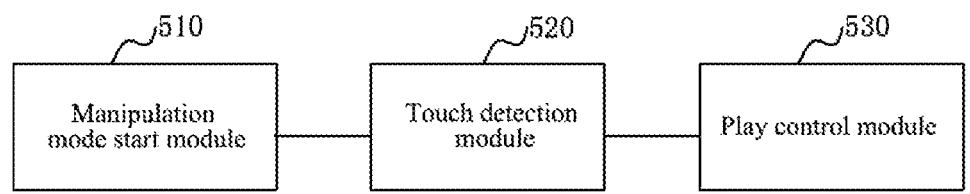
FIG. 5 is a schematic structural diagram of a device for manipulating presentation content of screen transmission according to an embodiment.

FIG. 5 is a schematic structural diagram of a device for manipulating screen transmission presentation content according to an embodiment of the present invention; as shown in FIG. 5, the device for manipulating the screen transmission presentation content in this embodiment includes: a manipulation mode start module 510, a touch detection module 520 and a play control module 530, the modules are detailed as follows:

the manipulation mode start module 510 is to receive play start information for presentation content at a screen transmission source end transmitted by a corresponding screen transmission hardware, and start a preset play manipulation mode at a screen transmission presentation end;

the touch detection module 520 is to detect a preset touch operation signal in the play manipulation mode, and obtain a preset play control instruction corresponding to the touch operation signal; and the play control module 530 is to control, according to the play control instruction, the presentation content at the screen transmission presentation end to enter a corresponding play state.

As a preferred embodiment, the play manipulation mode includes: displaying, on the presentation content at the screen transmission presentation end, a preset play toolbar, the preset play toolbar includes a plurality of touch control buttons. Correspondingly, the touch detection module 520 includes: a first detection submodule to detect a touch signal for a touch control button in the play toolbar; the device for manipulating the screen transmission presentation content further includes: a first setting module to establish an association between a touch signal of each touch control button and a corresponding play control instruction.

As another preferred embodiment, the play manipulation mode includes: generating, on the presentation content at the screen transmission presentation end, a transparent view layer for receiving a touch signal. Correspondingly, the touch detection module 520 includes: a second detection submodule to receive, the touch signal via the transparent view layer, and detect whether the received touch signal is the preset touch operation signal; the manipulation device further includes a second setting module to store several touch operation signals, and establish an association between each touch operation signal and a corresponding play control instruction. For example, the preset touch operation signal includes: a touch signal that is left-right slidable or a touch signal that is up-down slidable, which is detected via the transparent view layer.

It should be noted that the above two preferred embodiments may also be combined, that is, the play manipulation mode includes: both generating, on the presentation content at the screen transmission presentation end, a transparent view layer for receiving a touch signal and displaying a preset play toolbar on the presentation content at screen transmission presentation end, where the play toolbar includes a plurality of touch control buttons.

As another preferred embodiment, the device for manipulating the screen transmission presentation content described above further includes: a manipulation mode close module to receive the play end information transmitted by the screen transmission hardware for the presentation content at screen transmission source end, and control the screen transmission presentation end to exit the play manipulation mode.

Preferably, in this embodiment, the play control instruction includes a page flipping instruction, a presentation exit instruction, or an annotation instruction. Correspondingly, the play control module 530 may be specifically to: if in the case of the flipping over instruction, control the presentation content at the screen transmission presentation end to flip over; if in the case of the presentation exit instruction, control the screen transmission presentation end to exit a presentation of the presentation content; if in the case of the annotation instruction, control the screen transmission presentation end to switch to a preset annotation mode, detect, in the annotation mode, touch operation information at the screen transmission presentation end, and generate, according to the touch operation information, corresponding annotation information.

As another preferred embodiment, the device for manipulating the screen transmission presentation content described above further includes: a feedback notifying module to transmit, via the screen transmission hardware, flipping event information at the screen transmission presentation end to the screen transmission source end, so that the screen transmission source end controls a corresponding flip-over of the presentation content after receiving the flipping event information.

Figure 6:
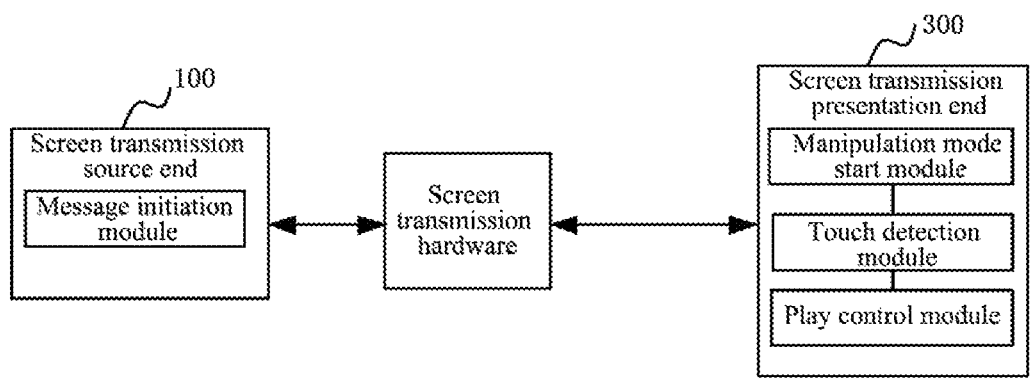
FIG. 6 is a schematic structural diagram of a system for manipulating presentation content of screen transmission according to another embodiment.

FIG. 6 is a schematic structural diagram of a system for manipulating screen transmission according to an embodiment. As shown in FIG. 6, the system for manipulating the presentation content of screen transmission in this embodiment includes a screen transmission source end 100 and a screen transmission presentation end 300 coupled to the screen transmission source end 100 via corresponding screen transmission hardware. Moreover, the screen transmission source end 100 includes:

a message initiation module to monitor a play start event for presentation content at the screen transmission source end, and transmit the play start information to the corresponding screen transmission presentation end via a preset screen transmission hardware;

the screen transmission presentation end 300 includes:

a manipulation mode start module to receive the play start information for the presentation content at the screen transmission source end transmitted by the screen transmission hardware, and start a preset play manipulation mode;

a touch detection module to detect a preset touch operation signal in the play manipulation mode, and obtain a preset play control instruction corresponding to the touch operation signal; and a play control module to control, according to the play control instruction, the presentation content at the screen transmission presentation end to enter a corresponding play state.

As a preferred embodiment, the message initiation module of the screen transmission source end 100 is further to monitor a play end event for the presentation content at the screen transmission source end, and transmit play end information to the screen transmission presentation end via the screen transmission hardware; correspondingly, the screen transmission presentation end 300 further includes: a manipulation mode close module to receive the play end information transmitted by the screen transmission hardware, and control the screen transmission presentation end to exit the play manipulation mode.

As a preferred embodiment, the screen transmission source end 100 further includes: a state monitoring module to monitor a play start event or a play end event for the presentation content at the screen transmission source end by calling a corresponding COM component, or by monitoring a change in a state of a display window.

It should be noted that, in the embodiments of the exemplary device/system for manipulating the presentation content of screen transmission described above, since the information interaction and execution process between the modules/units is based on the same concept as that of the foregoing method embodiments of the present invention, it achieves the same technical effects as those of the foregoing method embodiments of the present invention. For details, reference may be made to descriptions in the method embodiments of the present invention, and details will not be described herein again.

Further, in the embodiments of the exemplary device/system for manipulating the presentation content of screen transmission described above, the logical division of each functional module is only an example. In practical applications, as needed, for example, due to configuration requirements of corresponding hardware or for the convenience of implementation of software, the above-described function allocation is completed by different functional modules, that is, the internal structure of the device/system for manipulating the presentation content of screen transmission for the presentation content is divided into different functional modules to complete all or part of the functions described above. Each functional module may be implemented in the form of hardware or in the form of a software functional module.

A person skilled in the art can understand that all or part of the processes in the foregoing embodiments can be implemented by a computer program to instruct related hardware, and the program can be stored in a computer readable storage medium, sold or used as an independent product. The program, when executed, may perform all or part of the steps of the embodiments of the methods described above. The storage medium may be a magnetic disk, an optical disk, a read-only memory (Read-Only Memory, ROM), a random access memory (Random Access Memory, RAM), or the like.

In the above embodiments, each embodiment is described with a different emphasis, and for the part not elaborated in a certain embodiment, reference may be made to related descriptions in other embodiments. It will be appreciated that the terms such as "first", "second", and the like, as used herein, are used to distinguish objects, but these objects are not limited by these terms.

The above-described embodiments are merely illustrative of several implementing schemes of the invention, but should not be construed as limiting the scope of the present invention. It should be noted that variations and modifications may be made by those skilled in the art without departing from the concept of the present invention. Therese variations and modifications all fall into the protection scope of the present invention. Therefore, the scope of the present invention should be subject to the appended claims.

What is claimed is:

1. A method for manipulating presentation content of screen transmission, comprising:

receiving, by a screen transmission presentation end, play start information for presentation content originated at a screen transmission source end transmitted via a corresponding screen transmission hardware, wherein the screen transmission presentation end in a default mode synchronously presents a presentation of the presentation content on the screen transmission source end;

starting, at the screen transmission presentation end, a preset play manipulation mode according to the play start information originated at the screen transmission source end transmitted via the corresponding screen transmission hardware;

detecting a preset touch operation signal in the play manipulation mode;

obtaining a play control instruction corresponding to the touch operation signal; and controlling, according to the play control instruction, the presentation content at the screen transmission presentation end to enter a corresponding play state.

2. The method for manipulating presentation content of screen transmission according to claim 1, wherein the preset play manipulation mode comprises: displaying, above the presentation content at the screen transmission presentation end, a preset play toolbar, the preset play toolbar comprising a plurality of touch control buttons;

wherein the detecting the preset touch operation signal in the preset play manipulation mode comprises: detecting a touch signal for a touch control button in the play toolbar.

3. The method for manipulating presentation content of screen transmission according to claim 1, wherein the preset play manipulation mode comprises: generating, on an overlay layer of the presentation content at the screen transmission presentation end, a transparent view layer for receiving a touch signal; and wherein the detecting the preset touch operation signal in the play manipulation mode comprises: receiving the touch signal via the transparent view layer, and detecting whether the received touch signal is the preset touch operation signal.

4. The method for manipulating presentation content of screen transmission according to claim 3, wherein the preset touch operation signal comprises: at least one of a touch signal that is left-right slidable or a touch signal that is up-down slidable.

5. The method for manipulating presentation content of screen transmission according to claim 1, after starting the preset play manipulation mode at the screen transmission presentation end, further comprising:
receiving, via the screen transmission hardware, play end information for the presentation content originated at the screen transmission source end transmitted, and
controlling the screen transmission presentation end to exit the play manipulation mode.

6. The method for manipulating presentation content of screen transmission according to claim 1, wherein the play control instruction comprises a page flipping instruction, a presentation exit instruction, and an annotation instruction;
the controlling, according to the play control instruction, the presentation content at the screen transmission presentation end to enter the corresponding play state comprises:
controlling, if the play control instruction is the page flipping instruction, the presentation content at the screen transmission presentation end to flip a page;
controlling, if the play control instruction is the presentation exit instruction, the screen transmission presentation end to exit a presentation of the presentation content; and
controlling, if the play control instruction is the annotation instruction, the screen transmission presentation end to switch to a preset annotation mode, detecting, in the annotation mode, touch operation information at the screen transmission presentation end, and generating, according to the touch operation information, corresponding annotation information.

7. The method for manipulating presentation content of screen transmission according to claim 6, after controlling the presentation content at the screen transmission presentation end to flip the page, further comprising:
transmitting, via the screen transmission hardware, flipping event information at the screen transmission presentation end to the screen transmission source end, to allow the screen transmission source end to control a corresponding page flip of the presentation content after receiving the flipping event information.

8. The method for manipulating presentation content of screen transmission according to claim 1, wherein the screen transmission source end comprising a computer running presentation of a PowerPoint (PPT) file, and the screen transmission presentation end comprises a large touch screen, and wherein the play start information relates to starting to play the PPT file at the large touch screen.

9. A device for manipulating presentation content of screen transmission, comprising:
a manipulation mode start module to
receive, via a corresponding screen transmission hardware, play start information for presentation content originated at a screen transmission source end transmitted, wherein the device in a default mode synchronously presents a presentation of the presentation content on the screen transmission source end; and
start a preset play manipulation mode at the device according to the play start information originated at the screen transmission source end transmitted via the corresponding screen transmission hardware;
a touch detection module to detect a preset touch operation signal in the play manipulation mode, and obtain a play control instruction corresponding to the touch operation signal; and
a play control module to control, according to the play control instruction, the presentation content at the screen transmission presentation end to enter a corresponding play state.

10. The device for manipulating presentation content of screen transmission according to claim 9, wherein the preset play manipulation mode comprises: displaying, above the presentation content at the screen transmission presentation end, a preset play toolbar, the preset play toolbar comprises a plurality of touch control buttons;
wherein the touch detection module comprises: a first detection submodule to
detect a touch signal for a touch control button in the play toolbar, and
obtain the preset play control instruction corresponding to the touch operation signal.

11. The device for manipulating presentation content of screen transmission according to claim 9, wherein the preset play manipulation mode comprises: generating, on an overlay layer of the presentation content at the screen transmission presentation end, a transparent view layer for receiving a touch signal, and
wherein the touch detection module comprises: a second detection submodule to:
receive the touch signal via the transparent view layer;
detect whether the received touch signal is the preset touch operation signal; and
if so, obtain the preset play control instruction corresponding to the touch operation signal.

12. The device for manipulating presentation content of screen transmission according to claim 9, wherein the screen transmission source end comprising a computer running presentation of a PowerPoint (PPT) file, and the device comprises a large touch screen, and wherein the play start information relates to starting to play the PPT file at the large touch screen.

13. A system for manipulating presentation content of screen transmission, comprising a screen transmission source end and a screen transmission presentation end coupled to the screen transmission source end via a screen transmission hardware, wherein:
the screen transmission source end comprises: a message initiation module to monitor a play start event for presentation content at the screen transmission source end, and transmit play start information to the corresponding screen transmission presentation end via a preset screen transmission hardware;
the screen transmission presentation end comprises:
a manipulation mode start module to
receive, transmitted via a corresponding screen transmission hardware, the play start information for the presentation content at the screen transmission source end, wherein the device in a default mode synchronously presents a presentation of the presentation content on the screen transmission source end; and
start a preset play manipulation mode at the screen transmission presentation end according to the play start information originated at the screen transmission source end transmitted via the corresponding screen transmission hardware;
a touch detection module to detect a touch operation signal in the play manipulation mode, and obtain a preset play control instruction corresponding to the touch operation signal; and a play control module to control, according to the play control instruction, the presentation content at the screen transmission presentation end to enter a corresponding play state.

14. The system for manipulating screen transmission presentation content according to claim 13, wherein the message initiation module is further to monitor a play end event for the presentation content at the screen transmission source end, and transmit play end information to the screen transmission presentation end via the screen transmission hardware;

wherein the screen transmission presentation end further comprises: a manipulation mode close module to receive the play end information transmitted by the screen transmission hardware, and control the screen transmission presentation end to exit the play manipulation mode.

15. The system for manipulating presentation content of screen transmission according to claim 13, wherein the screen transmission source end further comprises: a state monitoring module to monitor a play start event or a play end event for the presentation content at the screen transmission source end by calling a corresponding COM component, or by monitoring a change in a state of a display window.

16. The system for manipulating screen transmission presentation content according to claim 13, wherein the screen transmission source end comprising a computer running presentation of a PowerPoint (PPT) file, and the screen transmission presentation end comprises a large touch screen, and wherein the play start information relates to starting to play the PPT file at the large touch screen.

* * * * *